Oct. 22, 1968    J. F. BAKER ET AL    3,406,523
BUFFERS OR ENERGY ABSORBERS
Filed July 11, 1966    4 Sheets-Sheet 1

INVENTORS
JOHN FLEETWOOD BAKER
BY PHILIP WILSON TURNER

Shoemaker and Mattare
ATTORNEYS

Oct. 22, 1968     J. F. BAKER ET AL     3,406,523
BUFFERS OR ENERGY ABSORBERS
Filed July 11, 1966     4 Sheets-Sheet 2

INVENTORS
JOHN FLEETWOOD BAKER
BY PHILIP WILSON TURNER
Shoemaker and Mattare
ATTORNEYS

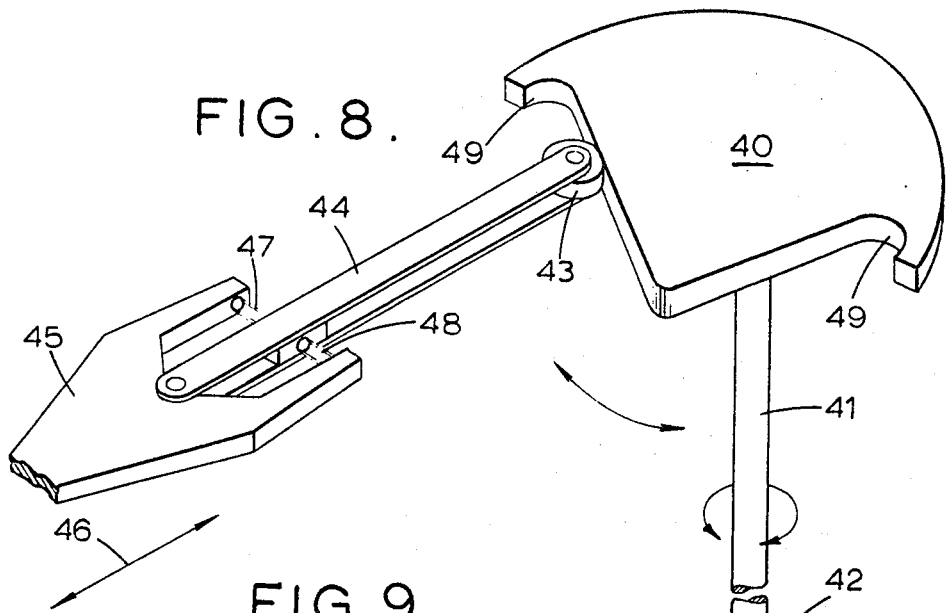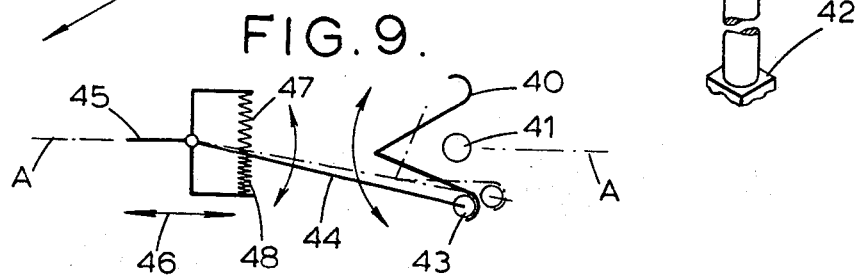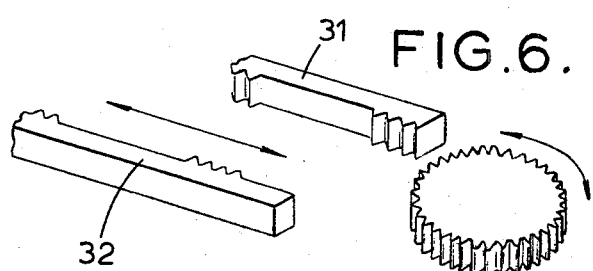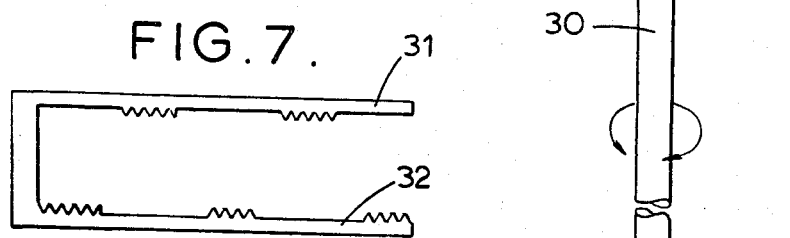

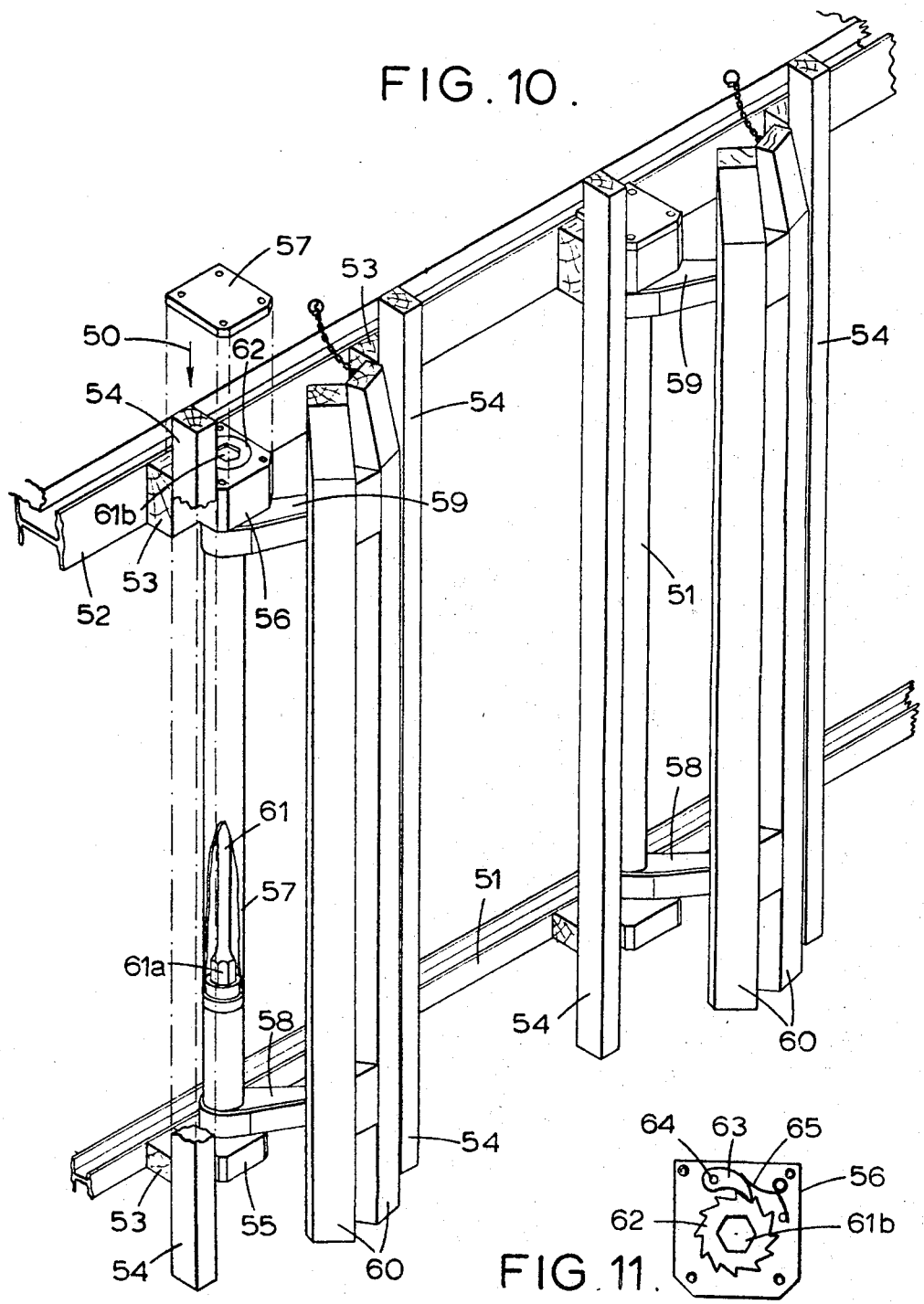

United States Patent Office 3,406,523
Patented Oct. 22, 1968

3,406,523
BUFFERS OR ENERGY ABSORBERS
John Fleetwood Baker and Philip Wilson Turner, Cambridge, England, assignors to Cambridge Fender & Engineering Company Limited, London, England, a British company
Filed July 11, 1966, Ser. No. 564,267
Claims priority, application Great Britain, Jan. 14, 1966, 1,953/66
8 Claims. (Cl. 61—48)

ABSTRACT OF THE DISCLOSURE

The buffer device includes a substantially vertically extending steel torque bar having one end thereof anchored to a base against rotation and an upwardly extending shock absorbing structure having its lower portion pivotally connected to the base. The upper end of the bar is free to rotate and the upper portion of the shock absorbing structure is movable in two directions. Means are employed to connect the upper portion of the shock absorbing structure to the upper end of the bar for imparting a torsional force to the torque bar when the upper portion of the shock absorbing structure is moved in one direction by the contacting force of a moving object.

---

This invention relates to buffers, buffer bars or energy absorbers.

A steel structure deformed beyond its yield point but short of its breaking point will absorb many times the energy which can be absorbed in an elastic deformation. If means be provided to maintain or restore the structure in or to its original shape after deformation, the cycle can be repeated. An energy absorber or buffer working on this principle can be compact and simple and is particularly suitable for certain applications.

According to the invention there is provided a buffer including one or more steel torsion bars arranged to absorb energy by being deformed beyond their yield point.

The size or proportion of the torque arms and bars, may be made such that any desired part of the stroke may be elastic. For example there may be provided a gentle take-up of load, essential in many applications, which will also serve to increase the life of the torsion bars since light impacts will not deform them beyond their yield point.

Preferably each torsion bar has one end fixed against rotation in at least one direction, its opposite end being free to rotate and being connected to a torque arm. The torque arm is pivotal about a fixed axis of the bar and is arranged to transmit load to the free end of the bar to rotate the free end about said axis. Under full load the bar is deformed beyond its yield point, thus providing a "square" load deflection curve and absorbing a large amount of energy with substantially no change in its shape. On the load being reduced the torsion bar will unwind elastically over a proportion of its stroke after which the ratchet mechanism may over-run to allow the torque arms to pivot further in the unwind direction to their original position.

The invention will be illustrated by way of example with reference to the accompanying drawings in which:

FIGURES 6 and 7 show a third alternative embodiment.

FIGURE 8 shows a fourth alternative embodiment with FIGURE 9 being a diagrammatic illustration indicating the method of operation of the buffer device shown in FIGURE 8.

FIGURE 10 is a schematic isometric view of a fender for a ship's berth incorporating yet a further embodiment of buffer means according to the invention, while FIGURE 11 is a detail view taken from above in the direction of the arrow 50 of FIGURE 10.

Figure 1:
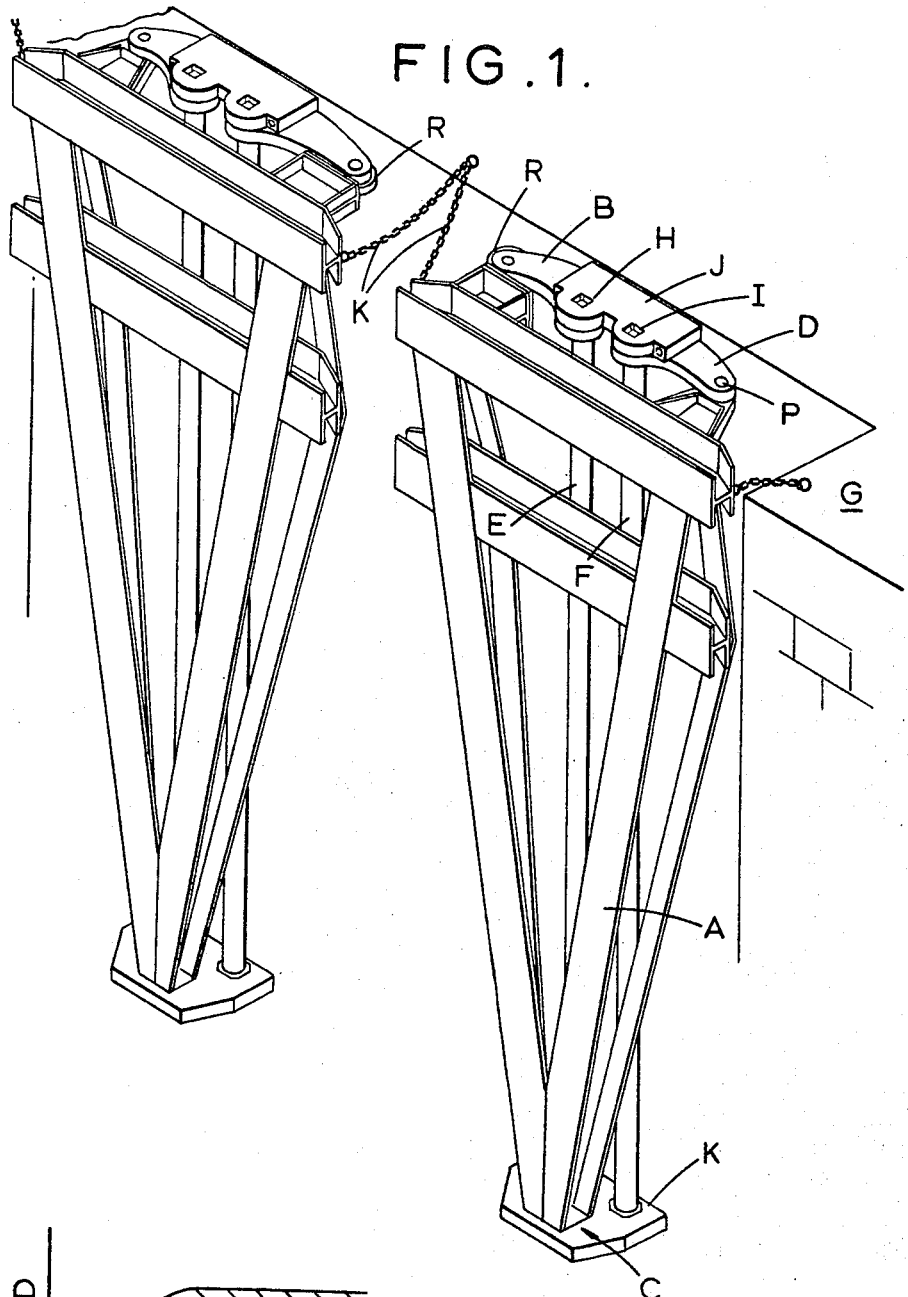
FIGURE 1 is a schematic isometric view of a fender for a ship's berth incorporating one embodiment of buffer means according to the invention.

In FIGURE 1, A represents a rigid framework which will be provided with vertical wooden rubbing strips (not shown) against which a ship bears when berthing.

The framework A is pivoted at its lower end at C to rotate about a horizontal axis parallel to the adjacent jetty wall and its upper end is carried by torque arms B and D, the frame being pivotally connected at P to arm D and bearing against a roller R attached to arm B. The torque arms are connected through unidirectional overrunning mechanisms in the form of ratchets to long vertical torsion bars E and F and are arranged to rotate about journals H and I respectively in a plate J fixed to a jetty G. The lower ends of the torsion bars are fixed against rotation in plate K which is attached to the jetty G.

Figure 2:
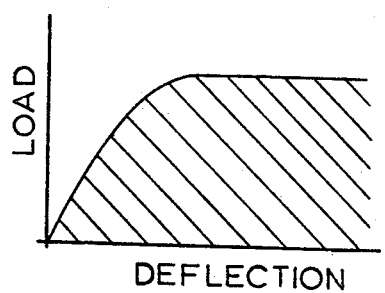
FIGURE 2 is a load/deflection diagram.

The buffer device operates as follows:

The ship coming alongside moves the frame A inwards towards the jetty G, thus rotating the torque arms B and D about the journals H and I and winding up the torsion bars E and F. Under full loads these are designed to deform beyond their yield point, thus providing a "square" load deflection curve (shown diagrammatically in FIGURE 2) and absorbing a large amount of energy for a minimum force on the ship.

As the ship moves away, the torsion bars E and F unwind elastically over a certain part of their stroke after which the ratchets overrun allowing the frame to return to its original position under its own weight (the frame being inclined forwards away from the jetty G, when seen in side elevation). Chains K limit the outward movement of the frame.

FIGURES 3 to 9 show various devices whereby in a buffer, load may be transmitted to a deformable torsion bar.

Figure 3:
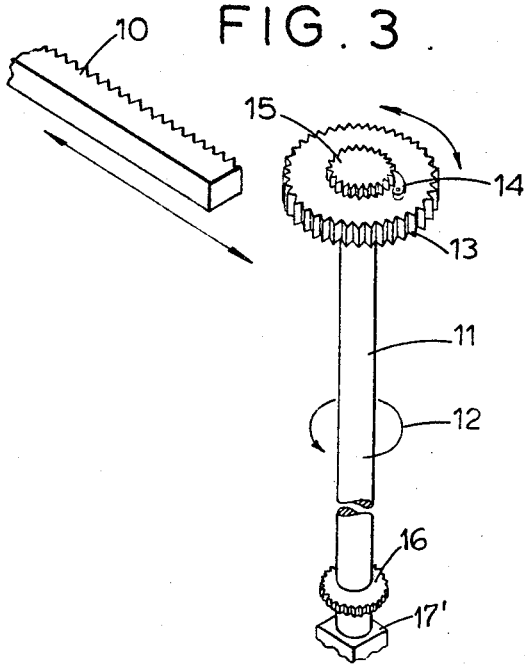
FIGURE 3 is a diagrammatic view of a first alternative embodiment of a buffer device equipped with ratchet mechanism.

In FIGURE 3 the load is arranged to act through the rack 10 in such manner as to wind a torsion bar 11 in the direction indicated by the arrow 12. The rack 10 is arranged to impart the load to a toothed wheel 13 which is freely rotatable on the bar 11 and is provided with a pivotally mounted pawl 14. The pawl 14 is provided with spring means (not shown) urging it against a ratchet toothed wheel 15 fast with the bar 11. With this arrangement after the bar 11 has been wound while resisting and absorbing a buffing shock, the rack is allowed to return towards its initial position with the pawl 14 overriding the teeth of the wheel 15. The bar is anchored to an immovable structure 16.

Figure 4:
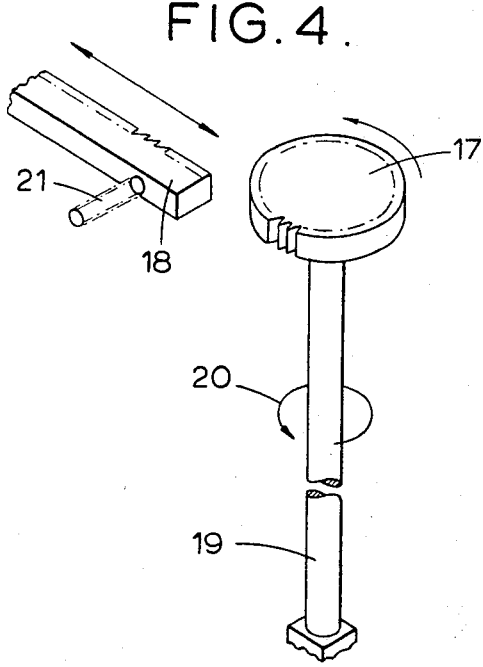
FIGURES 4 and 5 are diagrammatic views of a second alternative embodiment.
Figure 5:
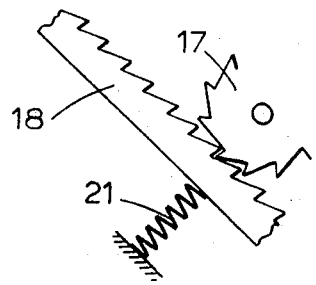

FIGURES 4 and 5 show an alternative arrangement in which the teeth on the rack 18 and on the wheel 17 which is fast with the torsion bar 19, are so shaped that they can override as the rack is returned after having wound the bar in the direction indicated by arrow 20. The rack 18 is urged into toothed engagement with the wheel 17 by a spring 21.

FIGURES 6 and 7 show devices to wind a torsion bar 30 backwards and forwards, first in one direction and then in the opposite direction. For relatively small oscillations this may increase the overall energy absorption.

In these drawings two racks 31 and 32 are ganged together, each rack having groups of teeth and intervening spaces, the groups of teeth of the rack 31 being staggered in relation to the groups of teeth on the rack 32. In this manner the racks are arranged alternately to engage the teeth of a wheel 33 fast with the bar 30. As the racks engage on opposite sides of the wheel 33, the bar 30 will be wound alternately backwards and forwards, when the racks are moved in either of two opposite directions indicated by the arrow 34.

In FIGURES 8 and 9 the unidirectional overrunning mechanism includes a cam 40 rigidly attached to one end of a torsion bar 41 whose opposite end is anchored to a fixed structure 42.

The cam 40 is engaged by a follower 43 mounted on a spring loaded link which is in turn pivotally mounted on a sliding bar 45 which is acted on by the load to be resisted and is constrained to move in a longitudinal direction indicated by the arrow 46 (axis A—A in FIGURE 9).

The link 44, when the follower 43 is disengaged from the cam 40, is urged in line with the axis A—A by spring 47 and 48. However, when the load moves the bar 45 towards the cam 40 along axis A—A, the follower 43 rolls along the cam 40 into one of recesses 49 and causes the cam 40 to rotate, winding the bar 41 and causing the nose 50 of the cam to move to one side of axis A—A. When load is no longer applied to the bar 45, means (not shown) are provided to cause it to return to the initial position with the follower 43 being then disengaged from the cam 40.

When load is again applied and the bar 45 approaches the cam 40 with the link 44 moving initially along the axis A—A the follower will strike the other side of the cam and will engage the other recess 49 to rotate the torsion bar 41 in the opposite sense to that which it was previously wound.

We would refer now to FIGURES 10 and 11 which show a fender for a ship's berth and in which 51 and 52 represent structural longerons of a jetty to which are fixed with intervening spacer blocks 53, vertical wooden rubbing posts 54.

Fixed to the longerons 51 and 52 respectively, are bearings 55 and 56 which support for rotation a torque tube 57. Torque arms 58 and 59 extend radially from the torque tube 57 and mount at their outer ends vertical wooden rubbing strips 60. When a ship berths it is intended that to prevent the ship abutting directly against the posts 54, it shall first abut with the strips 60 and the force of impact thereon will be transmitted by the arms 58 and 59 to cause rotation of the torque tube 57 in bearings 55 and 56.

Within the torque tube 57 is a torsion bar 61 whose lower end 61a is fixed to the tube 57 by being in spigotted connection with the lower end of the tube 57. At its upper end 61b the bar 61 projects beyond the tube 57 and is fixed to a ratchet wheel 62. The wheel 62 is housed within the casing of the bearing 56, 67 being a cover plate of the casing.

FIGURE 11 is a view taken in the direction of arrow 50 of FIGURE 10 with the cover plate 67 removed.

From FIGURE 11 it will be seen that the wheel 62 is engaged by a pawl 63 pivotally mounted on a pin 64 and urged by a spring 65 into contact with the ratchet wheel 62.

When a ship abuts with the strips 60 to rotate the torque tube 57 the lower end of the torsion bar 61 will also be rotated. However, the upper end of the torsion bar 61 will be held against rotation, since the pawl 63 will prevent rotation of the ratchet wheel 62.

If the load imparted from the ship is light, the torsion bar 61 will be elastically wound. However, with heavier loads, the torsion bar is arranged to be wound beyond its yield point before the ship makes contact with the rubbing posts 54.

When the ship ceases to make contact with the rubbing strips 60, means are provided for returning the torque arms 58 and 59 to their initial positions. If the bar 61 has been wound beyond its yield point, when the torque arms 58 and 59 return towards their initial positions the ratchet wheel 62 will overrun the pawl 63 beyond the point at which the bar 61 is elastically deformed.

The means for returning the torque arms 58 and 59 may comprise spring means (not shown) or alternatively, the axis of the torque tube 57 may be inclined outwardly from the jetty in such manner that the return movement is effected by the force of gravity. A chain 70 is provided to limit the outward movement of the arms 58 and 59.

After repeated impacts the torsion bar 61 together with the ratchet 62 may be removed from above and replaced.

It will be appreciated that for a berth intended for large ships a large number of torsion bar buffer devices will be arranged along the side of the berth so that the load is shared. The torsion bars are relatively inexpensive items and may be easily replaced, the overall cost of the system being favourable as against the cost if damage were sustained to the jetty itself. It is to be noted that in this embodiment replacement of the torsion bars can be effected from the top of the jetty and will not necessitate the erection of scaffolding or ladders on the face of the jetty.

We claim:

1. A buffer device for arresting a moving object, comprising a base, a substantially vertically extending steel torque bar having one end anchored to said base against rotation and having its opposite end free to rotate; upwardly extending shock absorbing structure having its lower portion pivotally secured to said base, and having its upper portion movable in two directions, means connecting said upper portion of said structure to the rotatable end of said bar, said means imparting a torsional force to said torque bar at a region spaced along the torsional axis of the bar from said anchored end when said upper portion of said shock absorbing structure is moved in one direction by the contacting force of said moving object.

2. A buffer device as defined in claim 1 wherein said means includes an overrunning ratchet and pawl device.

3. A buffer device as defined in claim 1 wherein the said means includes a cam mounted on the free end of the torque bar and a follower carried by the shock absorbing structure and traversing said cam.

4. A buffer device as defined in claim 1, wherein said means includes a torque arm extending radially from the free end of said bar and means connecting the free end of the torque arm to the shock absorbing structure.

5. A buffer device for arresting a moving object comprising a steel torque bar having one end anchored to a base against rotation and having its opposite end free to rotate; a torsion tube enclosing said bar and rotatable thereon, a radially extending torque arm having one end thereof fixedly secured to said torsion tube and having the other end carrying shock absorbing means adapted to be contacted by said moving object and the other end of said torque bar being fixed to said torsion tube to rotate therewith, said arm being located so that the force of impact of said moving object striking the shock absorbing means imparts a torsional force to said torque bar at a region spaced along the torsional axis of the bar from said anchored end whereby if said force is excessive said bar may undergo torsional plastic deformation beyond the elastic limit.

6. A buffer including a steel torsion bar, a rigid metal framework mounted on a jetty at the side of a ship's berth, upper and lower bearing assemblies carried by said metal framework, a torque tube extending between said bearing assemblies and supported for rotation thereby torque arms fixed to said torque tube and extending radially therefrom and outwardly from said framework and carrying at their outer ends said wooden strips, said torsion bar being located within said torque tube the lower end of said torsion bar being fixed to rotate with said torque tube when the latter is rotated in a first direction of rotation on the wooden rubbing strips being moved toward the metal framework, and the upper end of said torsion bar being held against rotation in said first direction of rotation.

7. A buffer according to claim 6 wherein said torsion bar is removably mounted within said torque tube for upward withdrawal.

8. A buffer according to claim 6 wherein a spring urged pawl engaged ratchet wheel is mounted on the upper end of said torsion bar.

References Cited

UNITED STATES PATENTS

| 3,145,685 | 8/1964 | Kulick | 61—48 X |
| 3,210,110 | 10/1965 | Chieger | 61—48 X |

FOREIGN PATENTS 879,255  10/1961  Great Britain.

JACOB SHAPIRO, *Primary Examiner.*